Jan. 30, 1968   E. B. LOHMEIER, JR   3,365,842
DRIVE MECHANISM FOR A PLURALITY OF ROTATABLE OBJECTS
Filed Oct. 21, 1965   2 Sheets-Sheet 2
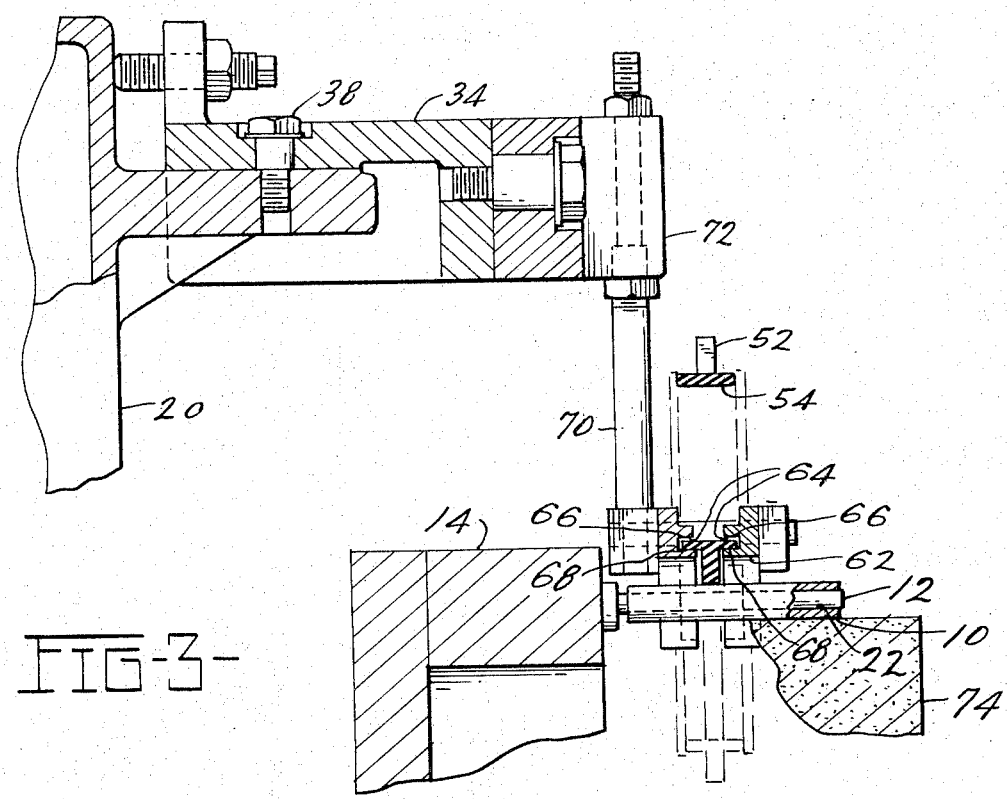
FIG-3-
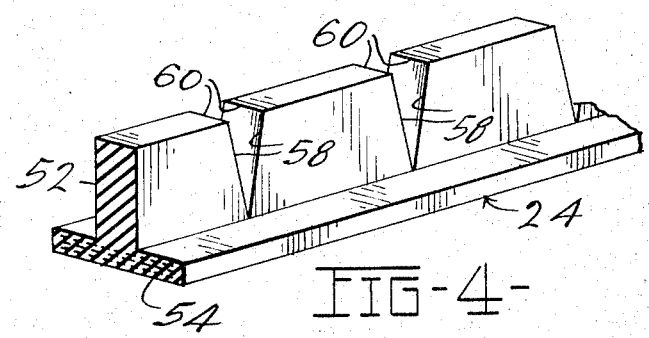
FIG-4-
INVENTOR:
EDWARD B. LOHMEIER, JR.
BY
Owen + Owen
ATT'YS.

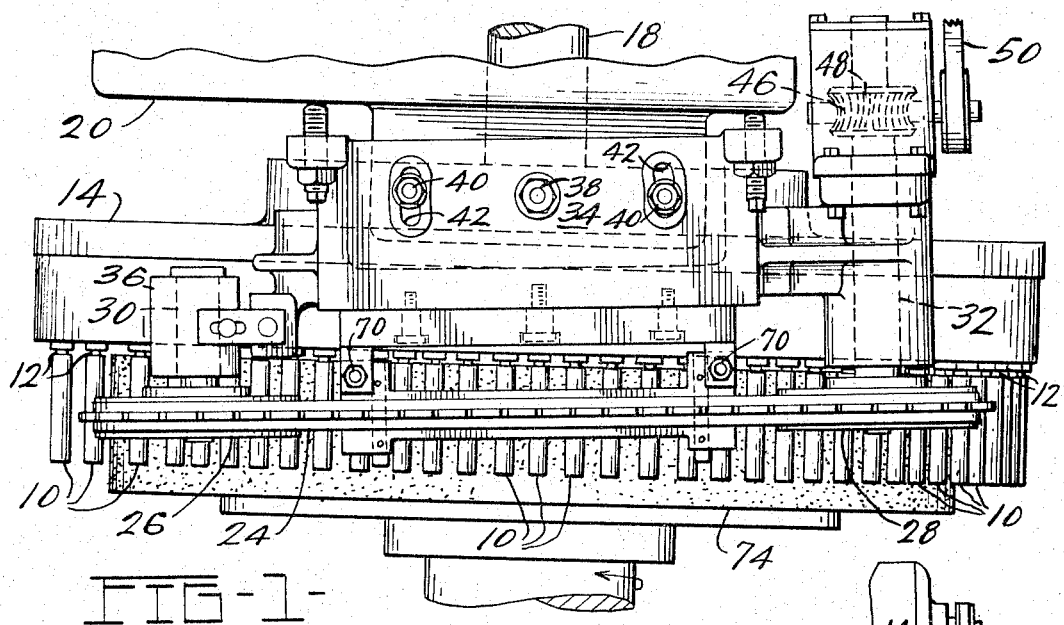
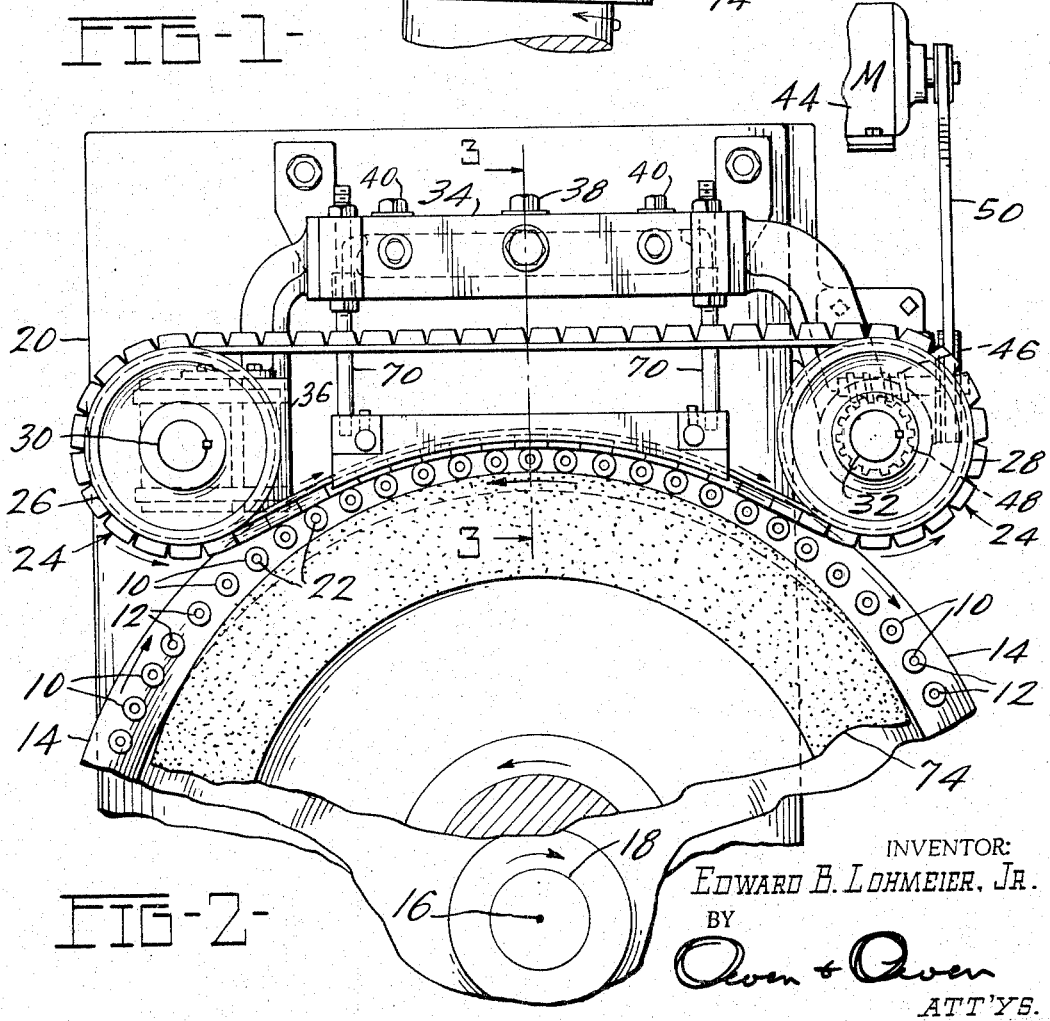

United States Patent Office 3,365,842
Patented Jan. 30, 1968

3,365,842
DRIVE MECHANISM FOR A PLURALITY OF ROTATABLE OBJECTS
Edward B. Lohmeier, Jr., Fraser, Mich., assignor to Champion Spark Plug Company, Toledo, Ohio, a corporation of Delaware
Filed Oct. 21, 1965, Ser. No. 500,043
4 Claims. (Cl. 51—108)

The present invention relates to new and improved apparatus for rotating generally cylindrically shaped objects mounted on spindles; and more particularly to apparatus for rotating objects mounted on spindles carried by a turret which moves the spindles through a predetermined arcuate path.

Turret structures are conventionally used for moving workpieces sequentially past work performing tools such as grinding wheels etc. In some types of apparatus used heretofore, rubber covered wheels or belts have been used to rotate the shafts or spindles on which workpieces are mounted while the workpieces mounted thereon engage the work performing tool. In these instances, the individual spindles are rotatably mounted in the turret structure and the wheels or belts engage circular flanges or wheels fixed to the rotatable spindles. In still other instances, tubular workpieces have been carried on stationary spindles and the workpieces themselves have been revolved relative to the spindles by wheels which directly engage the portions of the workpieces opposite the work performing tool. In these instances, separate means must be provided for telescoping the workpieces onto the spindles and for thereafter moving the workpieces firmly against locating stops prior to the time that they engage the work performing tool. One of the difficulties with such structures is that the driving mechanism rotates only but one or two workpieces at a time and, therefore, either work can only be done on one or two spindles of the turret structure, or a multiple number of driving wheels must be provided. According to principles of the present invention, a simple structure drives a plurality of spindle mounted workpieces, and in addition, biases the workpieces against locating stops.

An object of the present invention is the provision of a new and improved and simplified structure for rotating a plurality of spaced-apart spindles and/or objects mounted thereon.

Another object of the present invention is the provision of a new and improved structure of the above-described type which simultaneously moves tubular workpieces telescoped over spindles against abutments at the same time that it produces rotation of the workpieces.

The invention resides in certain constructions and combinations and arrangements of parts, and further objects and advantages of the invention will become apparent to those skilled in the art to which it relates from the following description of a preferred embodiment described with reference to the accompanying drawing, forming a part of this specification, and in which:

FIG. 1 is a fragmentary plan view of a machine embodying the present invention;

FIG. 2 is a fragmentary elevational view of the portion of the machine shown in FIG. 1;

FIG. 3 is a fragmentary sectional view taken along the line 3—3 of FIG. 2; and

FIG. 4 is a perspective view of a portion of the belt shown in FIGS. 1, 2 and 3.

Although the invention may be otherwise embodied, it is herein shown and described as embodied in apparatus for contouring generally tubular workpieces that are telescoped over nonrotatable spindles mounted on a turret which moves the workpieces along an arcuate path of constant radius. It would be apparent, however, that the invention will also have utility in driving rotatable spindles carrying the workpieces 10, and further can be used to rotate spindles which move along paths that are other than circular.

The apparatus shown in the drawing comprises a plurality of spindles 12, which although they can be rotatably mounted on their support structure, are, in the present instance, fixed to a wheel or turret 14 on axes parallel to the axis of rotation 16 of the turret 14. It will be understood that the axis 16 can, in some instances be vertical, but in the present instance, the axis 16 is horizontal. The turret structure 14 is carried by a shaft 18 which in some instances, can be journaled with respect to the turret 14, but which in the present instance, is fixed to the turret and is rotatably mounted in the housing 20 of the machine. Only a portion of the housing 20 is shown since its construction is immaterial to an understanding of the present invention.

The machine shown in the drawing is adapted to move workpieces 10 that are mounted on the spindles at a loading station through a contouring station, where the external surface of the workpieces are given a desired shape, to an unloading station where the workpieces are removed from the spindles. In the machine shown in the drawings, the workpieces are loaded onto the spindles at a position not indicated, but which is located at the left side of FIG. 2, and are moved through a contouring station located at the uppermost portion of the turret structure to an unloading station (not shown) positioned at the right side of FIG. 2. It will be understood that the location of these stations is relatively unimportant since the turret structure can be moved either clockwise or counterclockwise about an axis which can be vertical or horizontal, or at an angle thereto.

The workpieces 10 which are contoured by the apparatus shown in the drawing, are generally tubular and have an opening 22 therethrough of a size which provides a sliding fit with respect to the spindles 12. As previously indicated, the spindles 12 can be rotatably mounted on the turret structure 14, but in the present instance, are fixed, and the workpieces 10 are caused to rotate thereupon.

The mechanism for rotating the workpieces 10 generally comprises a belt 24, which will later be described in detail, and which passes over two spaced-apart pulleys 26 and 28. The pulleys 26 and 28 may be supported for rotation in any suitable manner, and as shown in the drawing, are mounted on shafts 30 and 32, respectively which are fixed to the respective pulleys. The shaft 32 is journaled to one side of a head structure 34, and the shaft 30 is journaled in a bearing 36 which, in turn, is adjustably mounted on the other side of the head structure 34, to permit the spacing of the pulleys 26 and 28 to be varied and the belt 24 tightened. The head structure 34 is fixed to the housing 20 in a manner which permits it to be adjusted at an angle relative to the axis 16, for reasons which will later be explained. The head structure 34 is pivoted about a center bolt 38 and is adapted to be clamped in adjusted position by a pair of bolts 40 that are received in slots 42 in the head structure 34. In some instances, the belt 24 may remain stationary to cause the workpieces 10 to roll along the surface of the belt, but in the apparatus shown in the drawing, the shaft 32 is rotated by a motor 44 which rotates a worm gear 46 that meshes with a companion gear 48 fixed to the shaft 32, and which worm gear 46 is driven by a belt and pulley arrangement indicated generally at 50.

The belt 24 has a generally T-shaped cross section with a center leg 52 (see FIG. 4) which projects outwardly from a transverse base portion 54. It will be seen that the belt is flexed in one direction as it passes over the pulleys, and is flexed in the opposite direction as it passes over the workpieces 10 on the spindles 12. In order that the belt 24 can flex in opposite directions, the center leg 52 is provided with uniformly spaced-apart slots 58 which extend down to the base portion 54. The side surfaces 60 of the slots 58 are so constructed that they engage each other when the belt is flexed to the reverse curvature necessary to permit uniform engagement with the workpieces 10. The slots 58 are preferably of such width and contour that the side surfaces 60 engage each other with a slight pressure as the belt 24 passes over the workpieces so that a smooth, uniform outer surface is provided on the base portion 54 for engagement with the workpieces 10. Any irregularly applied force or "bumping action" is thereby eliminated as the belt passes over the workpieces.

Although it may not be necessary in all instances, a belt guide 62, best seen in FIG. 3, is provided for controlling the engagement of the belt 24 with the workpieces 10. The belt guide 62 is formed in two half sections each of which has a recess 64 therein adapted to receive the respective side of the base leg 54 of the belt. The recesses 64, of course, are generally of the same arcuate shape as is the path through which the spindles move. The outer surfaces 66 of the recesses 64 engage the outer surface of the base 54 to assure that the belt engages the workpieces 10 with a uniform pressure. The inner surfaces 68 of the recesses 64 generally hold the belt in place even though the belt is not engaged by workpieces on the spindles.

The belt guide 62 can extend perpendicularly, or normal, to the axis 16, but in the preferred embodiment, however, extends at a slight angle to the normal. Because the belt in the present instance moves in the same direction as does the turret, the end of the belt positioned in the direction of turret movement is positioned closer to the turret than is the opposite pulley. Engagement of the belt, therefore, with the workpieces 10 causes them to be biased towards their supported ends, and by providing suitable stops adjacent the turret, the parts can be moved and held in accurately located positions as they pass through the contouring station. In the embodiment shown in the drawing the opposite ends of the belt guide 62 are clamped to posts 70 which, in turn, are fixed to brackets 72 that, in turn, are adjustably positioned and supported on the head structure 34. By rotating the belt guide 62 about center bolt 38, the belt 24 and guides are simultaneously adjusted to move the workpieces against their stops.

Any suitable means can be used to contour the workpieces, and in the embodiment shown in the drawing, a grinding wheel is positioned radially inwardly of the belt 24 to engage the opposite side of the workpieces. Since in the apparatus shown in the drawing, the shaft 16 is horizontal, the grinding wheel 74 engages the workpieces at the uppermost portion of the arcuate path through which the workpieces are moved. This arrangement allows material removed from the workpieces to fall away from the belt and belt guide and the danger of contamination of the belt by collected grindings is reduced.

While the invention has been described in considerable detail, I do not wish to be limited to the particular embodiment shown and described, and it is my intention to cover hereby all novel adaptations, modifications and arrangements thereof which come within the practice of those skilled in the art to which the invention relates.

I claim:

1. Apparatus for contouring generally tubular workpieces having generally axially extending internal openings and outer surfaces of revolution to be contoured, said apparatus comprising: a turret rotatable about a fixed axis and having a plurality of generally axially extending spindles spaced at a uniform radial distance from said fixed axis, said spindles being constructed and arranged for receiving said openings of said workpieces, said turret moving said spindles and workpieces thereon along a predetermined arcuate path, a pair of spaced-apart pulleys positioned radially outwardly of said arcuate path, an endless belt of generally T-shaped cross section extending over said pulleys with one portion of the belt paralleling said arcuate path, said belt having a base leg engaged by said pulleys and a projecting center leg positioned to engage workpieces on said spindles, said center leg having spaced-apart slots with sidewalls projecting generally normal to said base leg, said sidewalls being spaced to abut each other when said center leg parallels said arcuate path and engages workpieces on said spindles, and means positioned radially inwardly of said arcuate path for contouring workpieces on said spindles, whereby workpieces on said spindles are smoothly and uniformly rotated by said belt.

2. Apparatus for contouring generally tubular workpieces having generally axially extending internal openings and outer surfaces of revolution to be contoured, said apparatus comprising: a turret rotatable about a fixed axis and having a plurality of generally axially extending spindles spaced at a uniform radial distance from said fixed axis, said spindles having a supported end and a cantilevered end and being constructed and arranged for receiving said openings of said workpieces, said turret moving said spindles and workpieces thereon along a predetermined arcuate path from a feed station to an unloading station, a pair of spaced-apart pulleys positioned radially outwardly of said arcuate path, an endless belt of generally T-shaped cross section extending over said pulleys with one portion of the belt paralleling said arcuate path, said belt having a base leg engaged by said pulleys and a projecting center leg positioned to engage workpieces on said spindles, said center leg having spaced-apart slots with sidewalls projecting generally normal to said base leg, said sidewalls being spaced to abut each other when said center leg parallels said arcuate path and engages workpieces on said spindles, and said belt extending at an angle relative to said axis of said turret which forces workpieces on said spindles toward said supported ends as the workpieces move along said arcuate path, and means positioned radially inwardly of said arcuate path for contouring workpieces on said spindles, and whereby workpieces on said spindles are smoothly and uniformly rotated by said belt.

3. Apparatus for contouring generally tubular workpieces having generally axially extending internal openings and outer surfaces of revolution to be contoured, said apparatus comprising: a turret rotatable about a fixed axis and having a plurality of generally axially extending spindles spaced at a uniform radial distance from said fixed axis, said spindles being constructed and arranged for receiving said openings of said workpieces, said turret moving said spindles and workpieces thereon along a predetermined arcuate path, a pair of spaced-apart pulleys positioned radially outwardly of said arcuate path, an endless belt of generally T-shaped cross section extending over said pulleys with one portion of the belt paralleling said arcuate path, said belt having a base leg engaged by said pulleys and a projecting center leg positioned to engage workpieces on said spindles, said center leg having spaced-apart slots with sidewalls projecting generally normal to said base leg, said sidewalls being spaced to abut each other when said center leg parallels said arcuate path and engages workpieces on said spindles, guide means for said portion of said belt supporting said base leg in position to cause said projecting center leg to engage workpieces on said spindles, and means positioned radially inwardly of said arcuate path for contouring workpieces on said spindles, and whereby workpieces on said spindles are smoothly and uniformly rotated by said belt.

4. Apparatus for contouring generally tubular workpieces having generally axially extending internal openings and outer surfaces of revolution to be contoured, said apparatus comprising: a turret rotatable about a fixed axis and having a plurality of generally axially extending spindles spaced at a uniform radial distance from said fixed axis, said spindles having a supported end and a cantilevered end and being constructed and arranged for receiving said openings of said workpieces, said turret moving said spindles and workpieces thereon along a predetermined arcuate path from a feed station to an unloading station, a pair of spaced-apart pulleys positioned radially outwardly of said arcuate path, an endless belt of generally T-shaped cross section extending over said pulleys with one portion of the belt paralleling said arcuate path, said belt having a base leg engaged by said pulleys and a projecting center leg positioned to engage workpieces on said spindles, said center leg having spaced-apart slots with sidewalls projecting generally normal to said base leg, said sidewalls being spaced to abut each other when said center leg parallels said arcuate path and engages workpieces on said spindles, guide means for said portion of said belt supporting said base leg in position to cause said projecting center leg to engage workpieces on said spindles, said guide means extending at an angle to said axis of said turret to cause workpieces on said spindles to be moved toward their supported ends, and means positioned radially inwardly of said arcuate path for contouring workpieces on said spindles, and whereby workpieces on said spindles are smoothly and uniformly rotated by said belt.

References Cited
UNITED STATES PATENTS

| | | | |
|---|---|---|---|
| 1,531,281 | 3/1925 | Garbin | 51—108 X |
| 1,991,712 | 2/1935 | Theler | 51—108 |

HAROLD D. WHITEHEAD, *Primary Examiner.*